(12) United States Patent
Agarwal et al.

(10) Patent No.: US 10,255,139 B2
(45) Date of Patent: Apr. 9, 2019

(54) SYNCHRONIZED BACKUP AND RECOVERY OF HETEROGENEOUS DBMSS USING THIRD PARTY BACKUP TOOL

(71) Applicant: SAP SE, Walldorf (DE)

(72) Inventors: Anant Agarwal, Cambridge, MA (US); Mahendra Chavan, Pune (IN); Nandan Marathe, Pune (IN); Dipesh Pandit, Pune (IN)

(73) Assignee: SAP SE, Walldorf (DE)

( * ) Notice: Subject to any disclaimer, the term of this patent is extended or adjusted under 35 U.S.C. 154(b) by 226 days.

(21) Appl. No.: 15/220,044

(22) Filed: Jul. 26, 2016

(65) Prior Publication Data

US 2018/0032408 A1 Feb. 1, 2018

(51) Int. Cl.
*G06F 11/14* (2006.01)
*G06F 17/30* (2006.01)

(52) U.S. Cl.
CPC ...... *G06F 11/1464* (2013.01); *G06F 11/1469* (2013.01); *G06F 17/30589* (2013.01)

(58) Field of Classification Search
None
See application file for complete search history.

(56) References Cited

U.S. PATENT DOCUMENTS

| 7,251,747 | B1 * | 7/2007 | Bean | G06F 11/1443 714/15 |
| 2010/0274983 | A1 * | 10/2010 | Murphy | G06F 11/1456 711/162 |
| 2011/0246425 | A1 * | 10/2011 | Munoz | G06F 11/1458 707/640 |

* cited by examiner

*Primary Examiner* — Alex Gofman
*Assistant Examiner* — Umar Mian
(74) *Attorney, Agent, or Firm* — Sterne, Kessler, Goldstein & Fox, P.L.L.C

(57) ABSTRACT

Synchronized backup and recovery of heterogeneous DBMSs is described herein. An embodiment operates by receiving, by at least one processor, a request for a data backup process at a first server; creating, by at least one processor, a pipe between processes of the first sever and the data backup process; performing, by at least one processor, the data backup process according to an execution command sent from a second server; and sending, by at least one processor, a result of the data backup process from the second server to the first server when the data backup process has terminated.

18 Claims, 8 Drawing Sheets

SYNCHRONIZED BACKUP AND RECOVERY OF HETEROGENEOUS DBMSS USING THIRD PARTY BACKUP TOOL

BACKGROUND

Dynamic tiering is a data base solution that allows for storing and querying often used, or hot, data, while also allowing for efficient storage and retrieval capabilities for managing less often used, or warm, data. This allows users to create extended tables which are stored and managed by the extended storage system. At the same time, users can perform structured query language (SQL) queries, data manipulation language (DML), and data definition language (DDL) operations on these extended tables. However, at present there are no unified backup and recovery algorithms that allow for backup and recovery in systems that use a single database management system (DBMS) that performs both dynamic tiering and non-dynamic tiering. Due to this, users are not able to easily and effectively backup the data of such systems.

BRIEF DESCRIPTION OF THE DRAWINGS

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, method and/or computer program product embodiments, and/or combinations and sub-combinations thereof, for synchronized backup of heterogeneous DBMSs.

Figure 1:
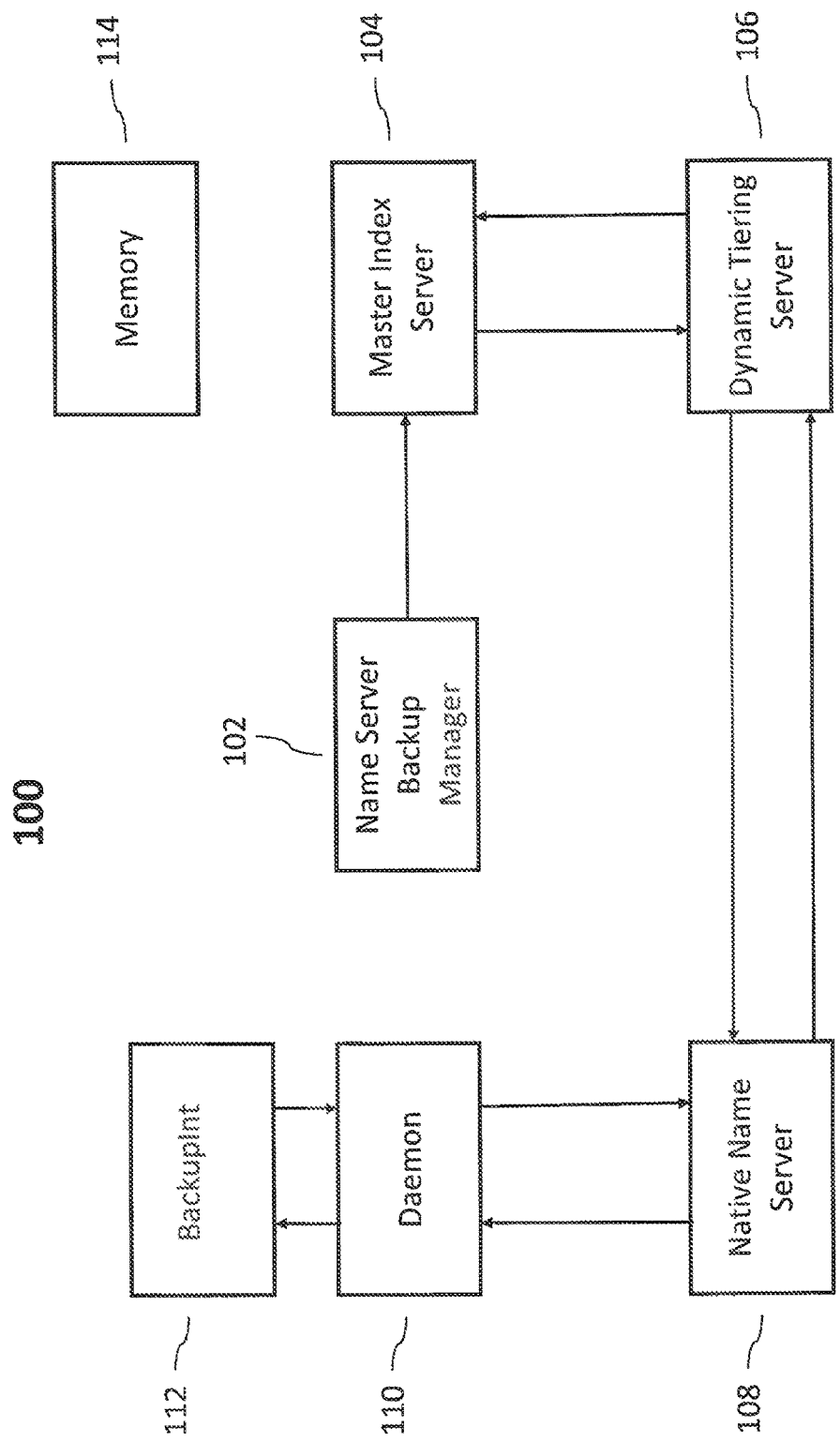
FIG. 1 is a block diagram of a system for synchronized backup and recovery of heterogeneous DBMSs, according to some embodiments.

FIG. 1 is a block diagram of a system for synchronized backup and recovery of heterogeneous DBMSs. According to an embodiment, a backup tool or apparatus or module 100 for synchronized backup and recovery of heterogeneous DBMSs may comprise Name Server Backup Manager (NSBM) 102, Master Server index 104, Dynamic Tiering (DT) Server 106, Native Name Server 108, Disk and Execution Monitor ("Daemon") 110, and Backup Initialization 112.

In an embodiment, NSBM 102 may comprise a computer program stored in memory 114. NSBM 102 may receive inputs comprising requests for data backup, parameters for data backup, conditions for data backup, or any combination thereof—to name a few examples. For example, NSBM 102 may receive an input comprising a data backup request for a desired database that uses a desired backup tool. In an embodiment, NSBM 102 may send backup requests based upon a received input, such as, for example, to Master Server Index 104.

According to an embodiment, Master Server Index 104 may comprise value identifier information for stored tables in a DBMS stored in memory 114. For example, Master Server Index 104 may comprise value identifiers for columns stored in a desired database. In an embodiment, when Master Server Index 104 receives a backup request, it may send a backup command, for example, to DT Server 106.

In an embodiment, DT Server 106 may comprise a server allowing for dynamic tiering of data stored in a DBMS. A server may comprise a computer or computer program stored in memory 114 that manages access to a centralized resource or service in a network. According to an embodiment, dynamic tiering comprises partitioning data stored on the DBMS based upon the usage of the data. For example, dynamic tiering of the data stored in a DBMS may comprise partitioning the stored data into hot data and warm data based upon the usage of the stored data. After the data has been partitioned, dynamic tiering may further comprise storing the hot data into a main table and storing the warm data into an extended table.

According to an embodiment, when DT Server 106 receives a backup command, DT Server may, in response, create a pipe, send commands, send results of a backup, or any combination thereof—to name a few examples. In an embodiment, a pipe may comprise a sequence of processes chained together by their standard streams, so that the output of each process feeds directly as input to the next one. For example, a pipe may comprise DT Server 106 and Backup Initialization 112 chained together so that an output of the DT Server 106 feeds into Backup Initialization 112 as an input.

According to an embodiment, DT Server 106 may send commands or results of a backup to Native Name Server 108, Master Server Index 104, or any combination thereof.

In an embodiment, Native Name Server 108 may comprise a server with stored topology data of the DBMS. A server may comprise a computer or computer program stored in memory 114 that manages access to a centralized resource or service in a network. According to an embodiment, topology data may comprise the location of running components and the server location of data (i.e. which data is located on which server). In an embodiment, Native Name Server 108 may be on the same host network as DT Server 106.

According to an embodiment. Native Name Server 108 may create infiles, create outfiles, send commands, or any combination thereof—to name a few examples. An infile may comprise data relating to what data is to be backed up according to a backup command or request. In an embodiment, outfiles may comprise an empty temporary file.

According to an embodiment, Name Server 108 may send commands to DT Server 106 and/or Daemon 110.

In an embodiment, Daemon 110 may comprise a background process stored in memory 114 that answers requests for services. For example, Daemon 110 may comprise a background process that receives a backup command from Name Server 108 and, in response, send a start command to Backup Initialization 112. According to an embodiment, Daemon 110 may send results to Native Name Server 108.

According to an embodiment, Backup Initialization 112 may comprise a program stored in memory 114 comprising commands for backing up and restoring data. For example, Backup Initial 112 may comprise read commands, write commands, result commands, or any combination thereof—to name a few examples. In an embodiment, Backup Initialization 112 may back up data to numerous locations such as memory 114, databases, data storage clouds, hard disk drives, or any combination thereof—to name a few examples.

Memory 114 may comprise any memory such as random access memory (RAM), read-only memory (ROM), a hard disk drive, flash memory, or any combination thereof—to name a few examples.

Figure 2:
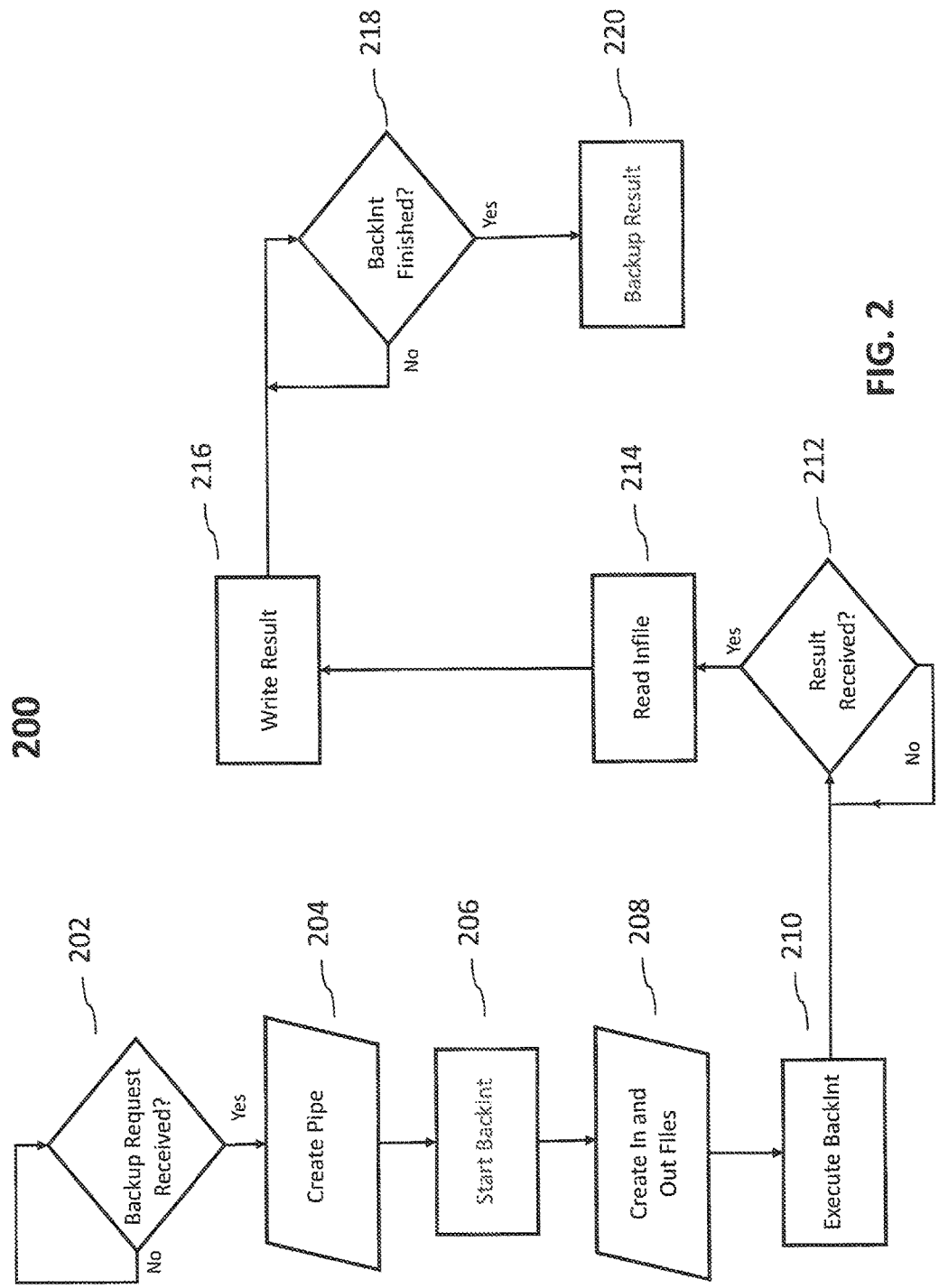
FIG. 2 is a flowchart illustrating a process for synchronized backup of heterogeneous DBMSs, according to some embodiments.

FIG. 2 is a flowchart illustrating a process for synchronized backup of heterogeneous DBMSs, according to some embodiments.

In an embodiment, at 202 NSBM 102 determines whether a backup request has been received. If a backup request has been received, NSBM 102 may send a further backup request to Master Server Index 104. In response, Master Server Index 104 may send a backup command to DT Server 106. If no backup request has been received by NSBM 102, 202 may be repeated.

At 204, DT Server 106 may create a pipe. The pipe may comprise DT Server 106 chained to Backup Initialization 112 so that an output from DT Server 106 feeds into Backup initialization 112 and an input. At 206, DT Server 106 may send a start Backup Initialization command to Native Name Server 108.

At 208, Native Name Server 108 may create an infile and an outfile according to the start Backup Initialization command received from DT Server 106. The infile may comprise references to the data to be backed up according to the received Backup Initialization command. For example, the DT Server 106 may receive a Backup Initialization command comprising a command to backup desired columns and extended tables. Based on this Backup Initialization command, Native Name Server 108 may create an infile comprising references to the desired columns and extended tables. In an embodiment, the outfile created by Native Name Server 108 may comprise an empty temporary file.

At 210, Native Name Server 110 may send an execute Backup Initialization command to Daemon 110. In response to the execute Backup Initialization command, Daemon 110 may send an execute command to Backup Initialization 112. Further, Daemon 110 may send the result of the execute Backup initialization command (e.g. whether Backup Initialization 112 began execution) and processor identifier (PID) to Native Name Server 110. In an embodiment, the PID may comprise data relating to Backup Initialization 112.

At 212, Native Name Server 110 may determine whether a result of the execute Backup Initialization command has been received. If the result has been received, DT Server 106 may write data to the pipe according to the start Backup Initialization command received by DT Server 106. For example, the DT Server 106 may receive a Backup Initialization command comprising a command to backup desired columns and extended tables. Based on this Backup Initialization command, DT Server may write the desired columns and extended tables to the pipe.

At 214, Backup Initialization 112 may read the infile created by Native Name Server 110. Further, Backup Initialization 112 may read the data written to the pipe by DT Server 106. According to an embodiment, Backup Initialization 112 may compare the data written to the pipe to the infile to determine what data is to be backed up. For example, Backup Initialization 112 may compare the data to be backed up from the infile to the data written to the pipe to determine what data is to be backed up. At 216, Backup Initialization 112 may back up the data written to the pipe according to the infile. According to an embodiment, Backup Initialization 112 may backup the data written to the pipe to a hard disk drive, cloud storage, database, or any combination thereof—to name a few examples. In an embodiment, Backup initialization 112 may further encrypt the data written to the pipe before it is backed up.

In an embodiment, at 216, Backup Initialization 112 may further write the result of backing up the data written to the pipe to the output file created by Native Name Server 110. Once the data has been backed up, Backup Initialization 112 may terminate.

At 218, Daemon 110 may determine whether a result of the backup has been received by Backup Initialization 112. Daemon 110 may determine whether Backup Initialization 112 has terminated. Daemon 110 may determine Backup Initialization 112 has terminated by checking to see if its child processes have ended, polling the Backup Initialization 112 to see if it has terminated, or any combination thereof—to name a few examples. If Daemon 110 determines Backup Initialization 112 has terminated. Daemon 110 may send a result that Backup Initialization 112 has been terminated to Native Name Server 108. If Backup Initialization 112 has not terminated, 218 may be repeated.

According to an embodiment, once Native Name Server 108 receives a result from Daemon 110, Native Name Server 108 may send a result to the DT Server 106 that Backup Initialization 112 has completed. At 220, DT Server 106 may send a result to Master Index Server 104 that Backup Initialization 112 has completed.

Figure 3:
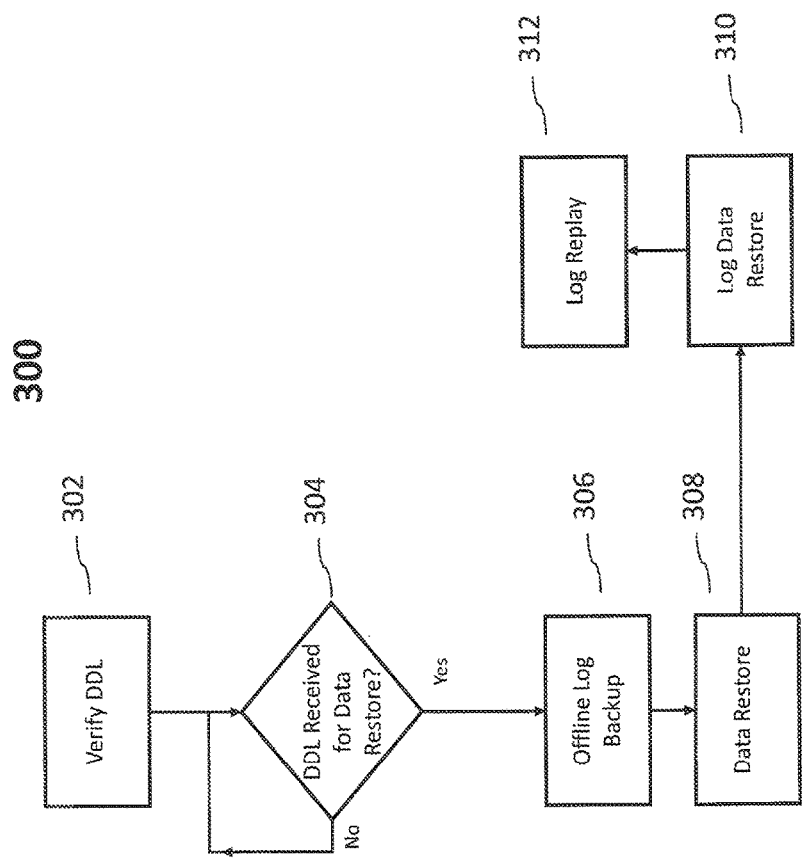
FIG. 3 is a flowchart illustrating a process for synchronized recovery of heterogeneous DBMSs, according to some embodiments.

FIG. 3 is a flowchart illustrating a process for synchronized recovery of heterogeneous DBMSs, according to some embodiments. By dynamically rebuilding non-critical data structures based on a query being executed, it is possible that only the necessary data structures are rebuilt, lowering the memory footprint.

At step 302, Master Index Server 104 may verify a data definition language (DDL) with the DT Server 106. A DDL may comprise a standard for commands that define the different structures in a database. DDL statements may create database objects, modify database objects, remove database objects, or any combination thereof—to name a few examples. Verifying the DDL may comprise sending a DDL statement to DT Server 106. In response, DT Server 106 may send a result as to whether the DDL is recognized by DT Server 106.

At 304, Master Index Server 104 may determine whether a DDL comprising a data restore was verified. If a DDL comprising a data restore is verified, a data restore request may be sent to DT Server 106. If such a DDL is not verified, 302 may be repeated.

At 306, an offline backup may be performed. During the offline backup, DT Server 106 may create a pipe. The pipe created may comprise DT Server 106 chained to Native Name Server 108 so that an output from DT Server 106 feeds into Native Name Server 108 as an input. Further, DT Server 106 may write the data to be backed up to the created pipe. According to an embodiment, 306 may further comprise DT Server 106 sending an offline backup request to Native Name Server 108. Native Name Server 108 may send a command for Backup Initialization 112 to back up the data written to the pipe as detailed in FIG. 2.

At 308, a data restore may be performed. During the data restore, DT Server 106 may create a pipe. The pipe created may comprise DT Server 106 chained to Native Name Server 108 so that an output from DT Server 106 feeds into Native Name Server 108 as an input. According to an embodiment, step 308 may further comprise DT Server 106 sending a data restore command to Native Name Server 108. Native Name Server 108 may send the command to the Backup Initialization 112 as detailed in FIG. 2.

In an embodiment, 308 may further comprise Backup Initialization 112 performing a data restore. A data restore may comprise Backup Initialization 112 reading backed up data according to the data restore command. After the data is read, Backup Initialization 112 may write the read data to the created pipe. The data written to the pipe may further be read by DT Server 106.

At 310, after the data is read by DT Server 106, DT Server may send a result of the data result to Master Index Server 104. In response to receiving the result, Master Index Server 104 may send a command to DT Server 106 to end the DDL.

At 312, a log replay is performed. During the log replay DT Server 106 may create a pipe for a number of backup logs. The pipes created may comprise DT Server 106 chained to Native Name Server 108 so that an output from DT Server 106 feeds into Native Name Server 108 as an input. According to an embodiment, 312 may further comprise DT Server 106 sending a log replay command to Native Name Server 108. Native Name Server 108 may send the command to the Backup Initialization 112 as detailed in FIG. 2.

In an embodiment, 312 may further comprise Backup Initialization 112 performing a log replay. A log replay may comprise Backup Initialization 112 reading backed up files according to the log replay command. After the data is read, Backup Initialization 112 may write the read data to the created pipe. The data written to the pipe may further be read by DT Server 106. Once the data is read by DT Server 106, a result of the log replay may be sent to Master Index Server 104.

Figure 4:
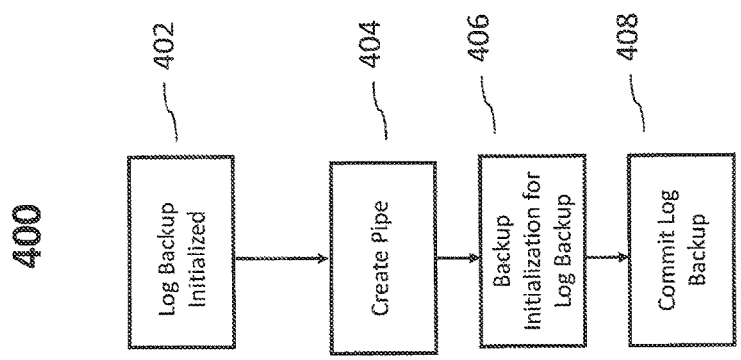
FIG. 4 is a flowchart illustrating a process for synchronized log backups of heterogeneous DBMSs, according to some embodiments.

FIG. 4 is a flowchart illustrating a process for synchronized log backups of heterogeneous DBMSs, according to some embodiments.

A log backup may be started. At 404, DT Server 106 may create a pipe. The pipe created may comprise DT Server 106 chained to Native Name Server 108 so that an output from DT Server 106 feeds into Native Name Server 108 as an input. Further, DT Server 106 may write data of a log to be backed up to the created pipe.

At 406, DT Server 106 may send an offline backup request to Native Name Server 108. Native Name Server 108 may send a command for Backup Initialization 112 to back up the data of the log written to the pipe as detailed in FIG. 2. At 408, DT Server 106 may send a backup finish entry to Master Index Server. In response, Master Index Server 104 may send a result of the backup finish entry.

Figure 5:
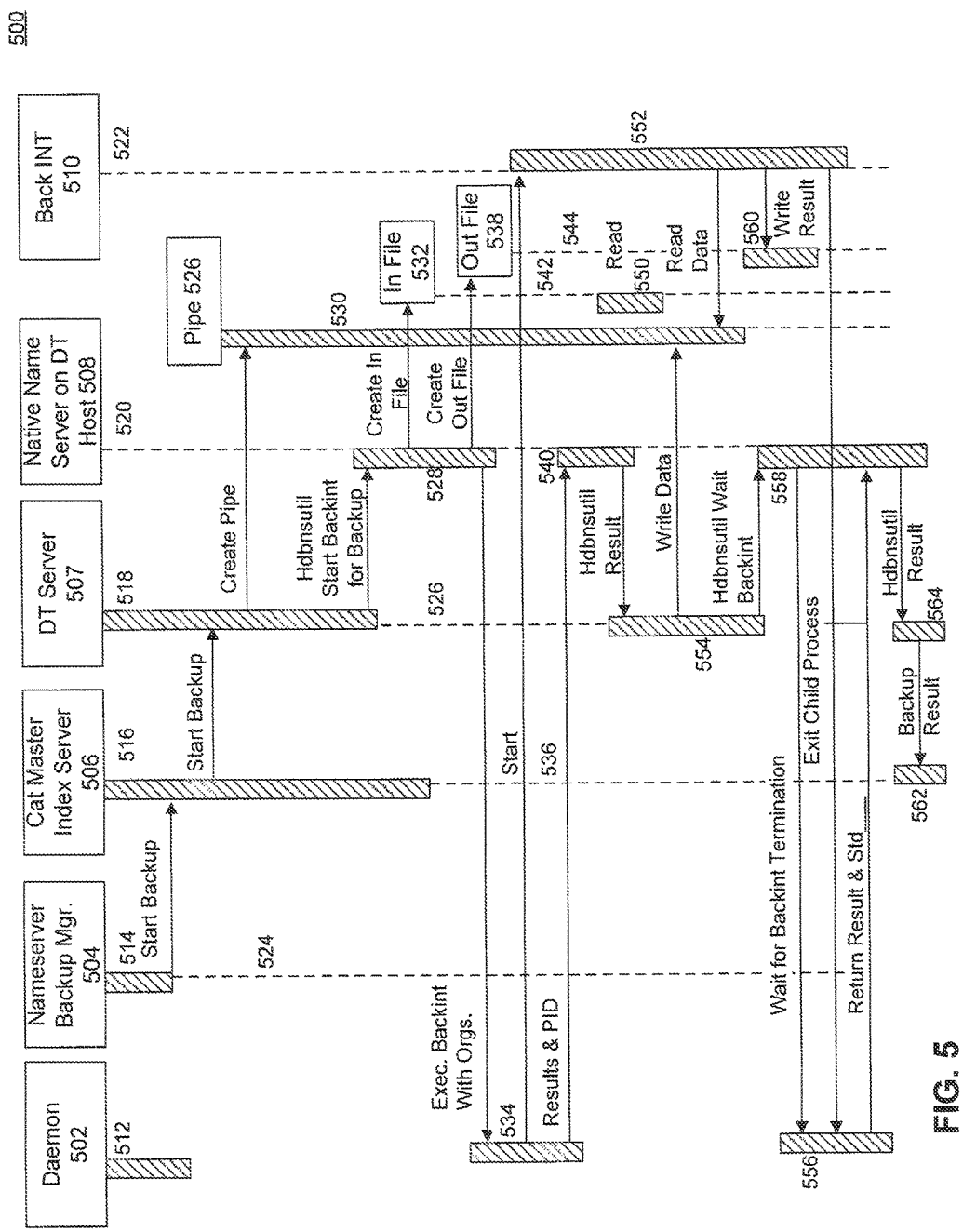
FIG. 5 is a signal flow diagram illustrating the process of FIG. 2 for synchronized backup of heterogeneous DBMSs, according to exemplary embodiment.

FIG. 5 is a signal flow diagram illustrating the process of FIG. 2 for synchronized backup of heterogeneous DBMSs, according to exemplary embodiment.

Figure 6:
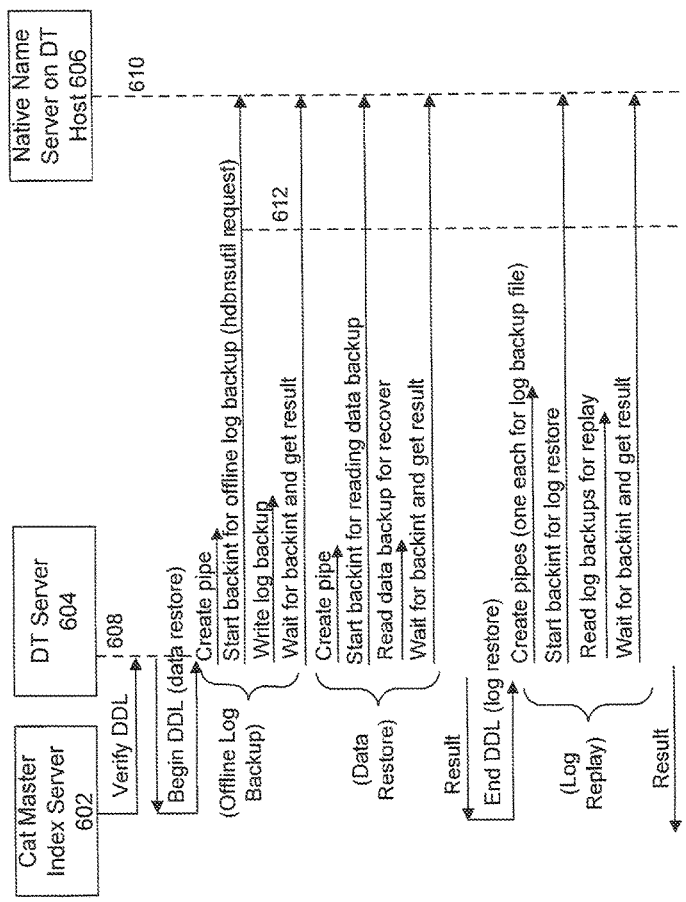
FIG. 6 is a signal flow diagram illustrating the process of FIG. 3 for synchronized recovery of heterogeneous DBMSs, according to an exemplary embodiment.

FIG. 6 is a signal flow diagram illustrating the process of FIG. 3 for synchronized recovery of heterogeneous DBMSs, according to an exemplary embodiment. According to an embodiment, the process for synchronized recovery of heterogeneous DBMSs may comprise a process between master index server 602, DT server 604, native name server 606, or any combination thereof. In an embodiment, native name server 606 may be on the same host network as DT server 604.

According to an embodiment, Master Index Server 602 may send and verify a DDL request to begin a data restore process as detailed in FIG. 3. In an embodiment, the data restore process may comprise an offline backup operation and a data restore operation.

According to an embodiment, the offline log backup operation may comprise creating a pipe. The pipe created may comprise DT Server 604 chained to Native Name Server 606 so that an output from DT Server 604 feeds into Native Name Server 606 as an input. Further, DT Server 604 may write the data to be backed up to the created pipe. According to an embodiment, the offline log backup may further comprise DT Server 604 sending an offline backup request to Native Name Server 606. In response, Native Name Server 606 may send a log backup command to a backup initialization, such as, for example, Backup Initialization 112, to back up the data written to the pipe as detailed in FIG. 2.

In an embodiment, the data restore operation may comprise creating a second pipe. The second pipe may comprise DT server 604 chained to Native Name Server 606 so that the output from Native Name Server 606 feeds into DT Server 604 as an input. According to an embodiment, the data restore operation may further comprise Native Name Server 606 sending an execute data restore command to a daemon, such as Daemon 110.

In an embodiment, in response to receiving the execute data restore command, the daemon may send an execute command to the backup initialization. According to an embodiment, the backup initialization may write data to the second pipe according to the execute data restore command. For example, Native Name Server 606 may send a data restore command comprising that desired data blocks from a log are to be restored to a daemon. The daemon may then send an execute command to a backup initialization. Once the execute command is received, the backup initialization may write the desired data blocks from the log to the second pipe.

According to an embodiment, once the data is written to the second pipe, DT Server 604 server may read the written data from the second pipe. For example, the backup initialization may write desired data blocks from a log to the second pipe. DT server 604 may then read the written desired data blocks from the block. In an embodiment, DT Server 604 may send the result of the data restore operation to Master Index Server 602.

In an embodiment, the data restore process may further comprise a log replay operation. The log replay operation may comprise DT Server 604 sending a log replay request to Native Name Server 606. According to an embodiment, the log replay request may comprise a request to restore a number of logs.

According to an embodiment, Native Name Server 606 may create a number of pipes according to the number of logs to be restored according to the log replay request. For example, DT Sever 604 may send a log replay request to Native Name Server 606 comprising a request for N logs to be restored. In response, Native Name Server 606 may create N pipes. In an embodiment, the number of pipes create comprise DT server 604 chained to Native Name Server 606 so that the outputs from Native Name Server 606 feeds into DT Server 604 as inputs.

In an embodiment, the log, replay operation may further comprise Native Name Server 606 sending an execute log replay command to the daemon. In response to receiving the execute log replay command, the daemon may send an execute command to the backup initialization. According to an embodiment, the backup initialization may write data of each log to be restored to a respective pipe. For example, DT Sever 604 may send a log replay request to Native Name Server 606 comprising a request for N logs to be restored, and in response, DT Server 604 may create N pipes. The backup initialization may write each of the N logs to a respective pipe of the N pipes.

According to an embodiment, once the data is written to the pipes, DT Server 604 server may read the written data from the pipes. For example, the backup initialization may write the requested logs to a respective pipe. DT server 604 may then read the requested logs from each pipe. According to an embodiment, DT Server 604 may send a result of the log replay operation to Master Index Server 602.

In an embodiment, the backup initialization will not restore a data block if a more current version of that data block has already been restored. For example, Data Block A may be modified by process A, process B, and process C. After each process, a log may be created, so that log A comprises Data Block A after process A (Data Block A1), log B comprises Data Block A after process B (Data Block A2), and log C comprises Data Block A after process C (Data Block A3.) Once Data Block A3 has been restored, Data Block A2 from log B and Data Block A1 from log A would not be restored.

According to an embodiment, the backup initialization writes the logs to the pipes from most recently created to least recently created. For example, log 3, then log 2, then log 1 would be written to the pipes in that order. Once a data block has been written to the pipes from the logs, DT Server 604 will only apply the data block from the most recent log. For example, the backup initialization may write Data Block A from log 3, log 2 and log 1 to the pipes. After DT Server 604 reads the data from the pipes, only Data Block A from log 3 will be applied.

Figure 7:
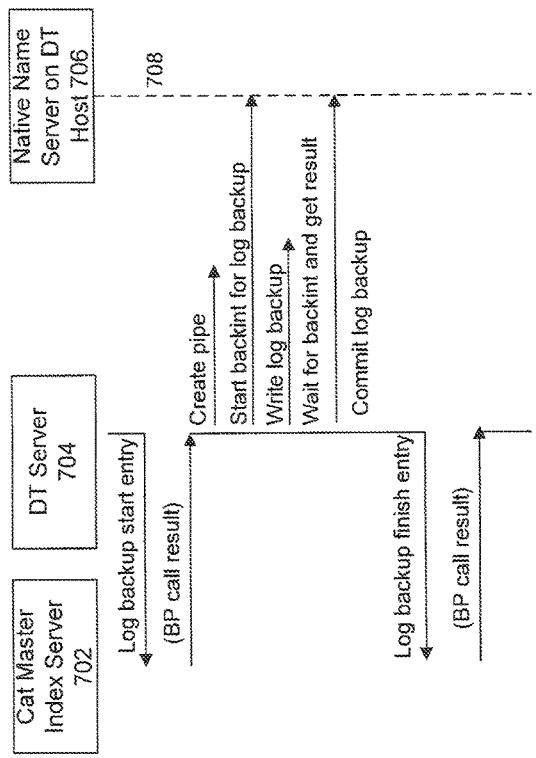
FIG. 7 is a signal flow diagram illustrating the process of FIG. 4 for synchronized recovery of heterogeneous DBMSs, according to an exemplary embodiment.

FIG. 7 is a signal flow diagram illustrating the process of FIG. 4 for synchronized recovery of heterogeneous DBMSs, according to an exemplary embodiment.

Various embodiments can be implemented, for example, using one or more well-known computer systems, such as computer system 800 shown in FIG. 5. For example, computer system 800 can execute an execution command to perform a backup initialization process. Computer system 800 can further create a pipe between two or more processes, according to some embodiments. Computer system 800 can be any computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Figure 8:
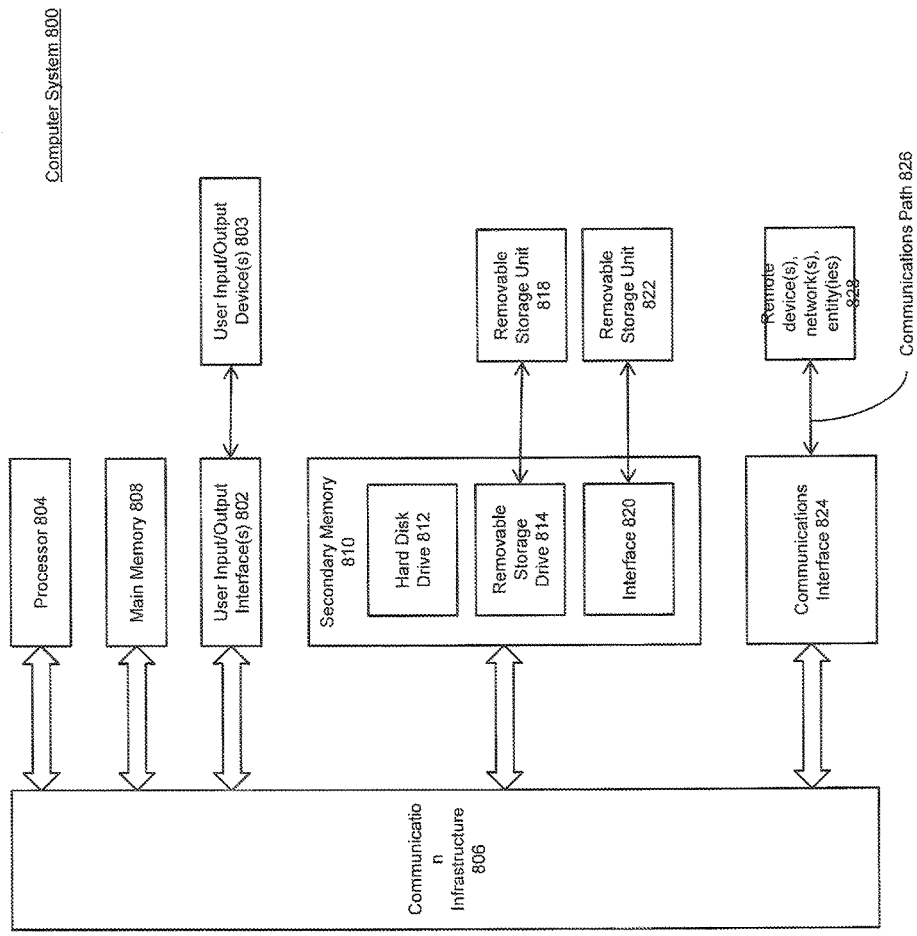
FIG. 8 is an example computer system useful for implementing various embodiments.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, blocks, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   receiving, by at least one processor, a request for a data backup process at a first server, wherein the first server comprises a database management system (DBMS), wherein the DBMS comprises data stored in a database of the DBMS;
   creating, by the at least one processor, an infile and a pipe between processes of the first server and the data backup process;
   accessing, by the at least one processor, a plurality of partitions of the database, including at least a first partition and a second partition;
   determining, by the at least one processor, that the first partition is configured to store hot data and that the second partition is configured to store warm data, the warm data being less often used than the hot data;
   executing, by the at least one processor, an execution command to perform the data backup process, wherein the execution command is received from a second server;
   storing, by the at least one processor, the hot data of the first partition into at least one main table;
   storing, by the at least one processor, the warm data of the second partition into at least one extended table;
   writing, by the at least one processor, the at least one extended table to the infile;
   reading, by the at least one processor, via at least one of the processes of the first server and the data backup process, backup data from the infile to the pipe;
   sending, by the at least one processor, via the data backup process, the backup data from the pipe to an outfile on the second server; and
   receiving, by the at least one processor, a result of the data backup process from the second server, at the first server, when the data backup process has terminated.

2. The method of claim 1, wherein the first and second servers are located on a host network.

3. The method of claim 1, wherein the first server supports dynamically tiered data.

4. The method of claim 1, further comprising:
   comparing, by the at least one processor, the data written to the pipe to the infile, wherein the infile is created by the second server; and
   determining, by the at least one processor, based on the comparing, which data to back up via a further request for a further data backup process.

5. The method of claim 1, further comprising:
   recovering, by the at least one processor, backed up data, wherein recovering comprises:
   executing, by the at least one processor, an execution command to perform a data restore; and
   reading, by the at least one processor, data from a second pipe between processes of the first server and the data backup process.

6. The method of claim 1, further comprising encrypting, by the at least one processor, the backup data from the infile to the pipe.

7. A system, comprising memory and at least one processor communicatively coupled to the memory and configured to:
   receive a request to perform a data backup process at a first server, wherein the first server comprises a database management system (DBMS), wherein the DBMS comprises data stored in a database of the DBMS;
   create an infile and a pipe between processes of the first server and the data backup process;
   access a plurality of partitions of the database, including at least a first partition and a second partition;
   determine that the first partition is configured to store hot data and that the second partition is configured to store warm data, the warm data being less often used than the hot data;
   execute an execution command to perform the data backup process, wherein the execution command is received from a second server;
   store the hot data of the first partition into at least one main table;
   store the warm data of the second partition into at least one extended table;
   write the at least one extended table to the infile;
   read, via at least one of the processes of the first server and the data backup process, backup data from the infile to the pipe;
   send, via the data backup process, the backup data from the pipe to an outfile on the second server; and
   receive a result of the data backup process from the second server, at the first server, when the data backup process has terminated.

8. The system of claim 7, wherein the first and second servers are located on a host network.

9. The system of claim 7, wherein to execute, the at least one processor is configured to:
write, by the at least one processor, the result of the data backup process to the outfile created by the first server.

10. The system of claim 7, wherein the second server supports dynamically tiered data.

11. The system of claim 7, wherein the at least one processor is further configured to encrypt the backup data from the infile to the pipe.

12. A tangible, non-transitory computer-readable storage device having instructions stored thereon that, when executed by at least one computing device, cause the at least one computing device to perform operations comprising:
receiving a request for a data backup process at a first server, wherein the first server comprises a database management system (DBMS), wherein the DBMS comprises data stored in a database of the DBMS;
creating an infile and a pipe between processes of the first server and the data backup process;
accessing a plurality of partitions of the database, including at least a first partition and a second partition;
determining that the first partition is configured to store hot data and that the second partition is configured to store warm data, the warm data being less often used than the hot data;
executing an execution command to perform the data backup process wherein the execution command is received from a second server;
storing the hot data of the first partition into at least one main table;
storing the warm data of the second partition into at least one extended table;
writing the at least one extended table to the infile;
reading, via at least one of the processes of the first server and the data backup process, backup data from the infile to the pipe;
sending, via the data backup process, the backup data from the pipe to an outfile on the second server; and
receiving a result of the data backup process from the second server, at the first server, when the data backup process has terminated.

13. The non-transitory computer-readable storage device of claim 12, wherein the first and second servers are located on a host network.

14. The non-transitory computer-readable storage device of claim 12, wherein the first server supports dynamically tiered data.

15. The non-transitory computer-readable storage device of claim 12, the operations further comprising:
recovering backed-up data, wherein recovering comprises:
executing an execution command to perform a data restore; and
reading data from a second pipe between processes of the first server and the data backup process.

16. The non-transitory computer-readable storage device of claim 15, the operations further comprising:
creating a plurality of pipes according to the execution command to perform the data restore.

17. The non-transitory computer-readable storage device of claim 15, the operations further comprising:
writing data from a plurality of logs to a respective pipe.

18. The non-transitory computer-readable storage device of claim 17, the operations further comprising:
reading data written to the plurality of logs; and
sending a result based on the data read.

* * * * *